United States Patent
Tannemyr et al.

[11] Patent Number: 6,081,383
[45] Date of Patent: Jun. 27, 2000

[54] MULTI-COLOR GOBO

[76] Inventors: Michael Tannemyr, Mariehemsvägen 13 E, S-906 54 Umeå, Sweden; Curt Edström, Skolgatan 108 A, S-903 32 Umeå, Sweden

[21] Appl. No.: 09/194,712
[22] PCT Filed: Jun. 11, 1997
[86] PCT No.: PCT/SE97/01020
  § 371 Date: Feb. 8, 1999
  § 102(e) Date: Feb. 8, 1999
[87] PCT Pub. No.: WO98/00670
  PCT Pub. Date: Jan. 8, 1998

[30] Foreign Application Priority Data

Jul. 1, 1996 [SE] Sweden ................................ 9602606

[51] Int. Cl.[7] .......................... G02B 27/14; G02B 26/08; G03B 21/14
[52] U.S. Cl. .............................. 359/634; 353/84; 359/298
[58] Field of Search .................... 359/634, 298; 353/84

[56] References Cited

U.S. PATENT DOCUMENTS

| | | | |
|---|---|---|---|
| 5,806,951 | 9/1998 | Roman et al. | 353/84 |
| 5,953,152 | 9/1999 | Hewlett | 359/298 |
| 5,959,768 | 9/1999 | Hutton | 359/359 |
| 6,011,640 | 1/2000 | Hutton | 359/234 |

*Primary Examiner*—Georgia Epps
*Assistant Examiner*—Saeed Seyrafi
*Attorney, Agent, or Firm*—John Lezdey & Assoc

[57] ABSTRACT

The present invention relates to a multi-color gobo for the projection of a multi-color pattern, and to a method of manufacturing the gobo. On the basis of a multi-color pattern that is color-separated into single-color components, the single-color components are disposed to parallel planes in the gobo and at least two of these planes are mutually separated by means of a transparent substrate. The gobo may include a plurality of mutually superimposed disc-shaped and transparent substrates and each of the substrates may include a dichroic surface coating so as to form a color filter. Combinations of the color filters are able to reproduce the colors of the multi-color pattern and respective color-emitting surface coatings present a pattern that coincides with the pattern of corresponding color components in the multi-color pattern.

7 Claims, 1 Drawing Sheet

MULTI-COLOR GOBO

FIELD OF THE INVENTION

The present invention relates to a multi-colour gobo.

BACKGROUND OF THE INVENTION

Gobos are used in theatres, TV studios, etc., to set desired light patterns and to project a pattern onto a surface. Gobos are a type of diapositive image placed in powerful projectors for projecting the pattern of the gobo onto a background to provide a light pattern or a light image thereon. In order to enable the light pattern to appear in a non-darkened surrounding, powerful projectors are required, these projectors generating a great deal of heat, partly in the form of IR radiation, meaning that the gobo must be heat-resistant.

Because of the high temperatures that prevail, typical plastic diapositives or transparencies cannot be used and it is necessary to either cut or etch the contours of the patterns in metal sheets or in a metal-coated glass sheet. The most usual method of colouring a pattern at present is to mount a colour filter in front of or behind the pattern. This enables only one colour to be applied, however. A multi-colour picture or image can be produced by this method with the aid of several projectors, each having a colour-part of the image directed on one and the same surface, wherewith the overlapping projections reproduce the basic pattern in colour.

It is known to produce a multi-colour image with the aid of a gobo by building-up a plurality of colour-emitting dichroic coatings on a glass plate. The colour-emitting coatings are built-up one at a time. Each coating corresponds to a colour in the image and consequently it is necessary to re-mask when one coating/colour has been built-up and the build-up of a new coating/colour shall commence. In turn, each coating involves a plurality of thin layers with alternate high and low refractive indexes. The coating is normally applied in a vacuum vapourization chamber. It is necessary to remove the glass plate from the chamber and re-mask between coatings, which is a time-consuming, expensive and irrational process. Furthermore, there is a risk of contamination each time the glass plate is masked or removed from the chamber.

SUMMARY OF THE INVENTION

An object of the present invention is to overcome the aforesaid drawbacks and to provide a multi-colour gobo. This object is achieved with a multi-colour gobo that have the characterizing features set forth in the following independent claim.

Further features of the invention and advantages afforded thereby will be evident from the dependent claims and also from the following detailed description of a preferred, non-limiting embodiment of the invention. To facilitate an understanding of the description, the descriptive text includes references to the accompanying drawings, in which mutually equivalent or similar parts have been identified by the same reference signs.

DESCRIPTION OF THE PREFERRED EMBODIMENTS

Figure 1:
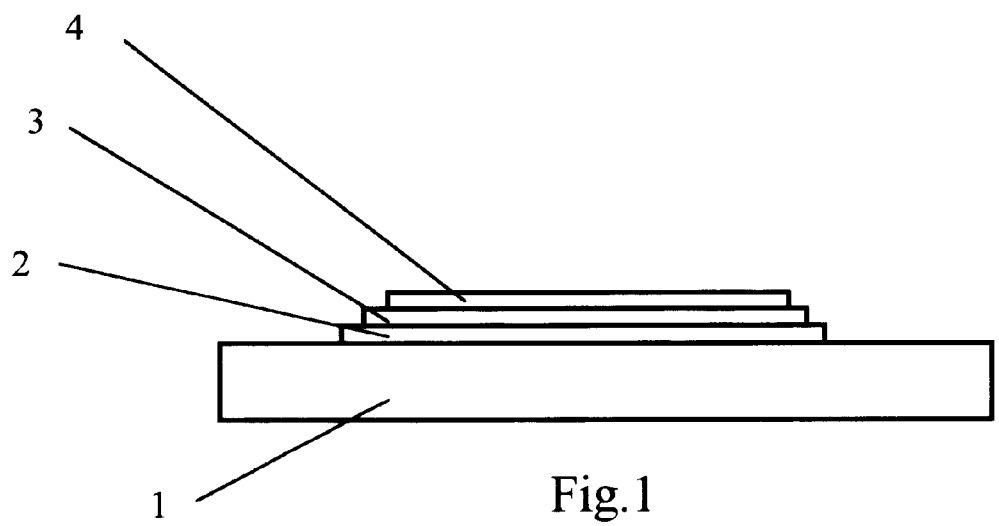
FIG. 1 is a schematic side view of a multi-colour gobo according to one embodiment of the present invention.
Figure 2:
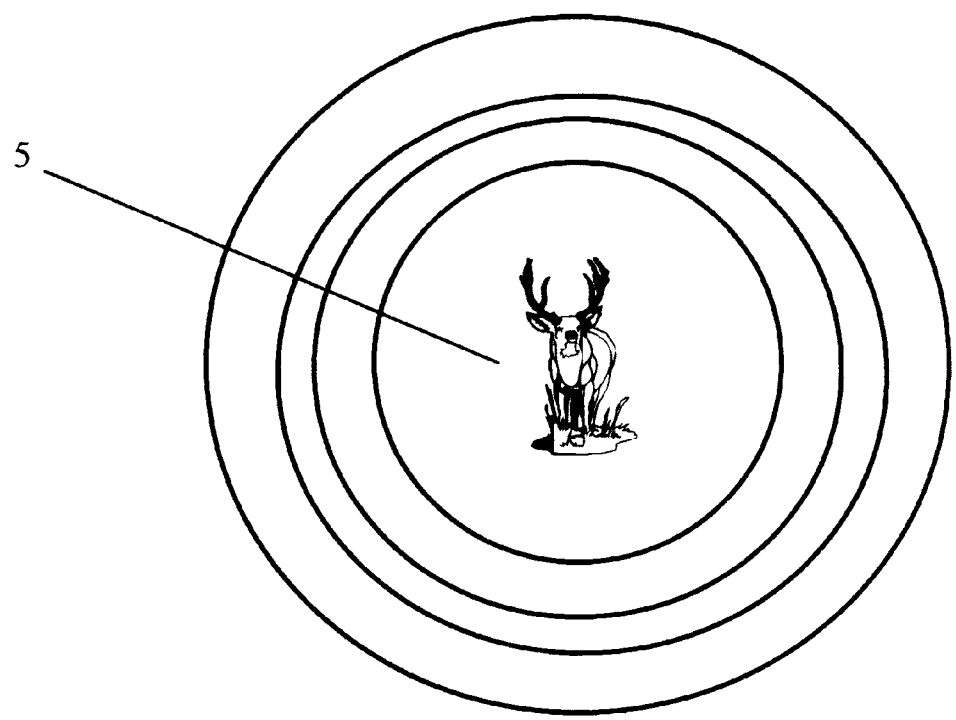
FIG. 2 illustrates the multi-colour gobo according to FIG. 1 schematically and from above.

The multi-colour gobos shown in FIGS. 1 and 2 is circular in shape and can be used in a so-called profile projector to project a multi-colour pattern.

The multi-colour pattern to be projected is colour-separated and rastered (or halftoned) in a manner known in the printing field, resulting in an array of single colour components. Colour separation is effected for instance in a computer that includes appropriate software. Those colours into which the image shall be separated are given and the separating and rastering operation is carried out. This results in what are designated here as single colour components, which is an array of patterns, one for each colour into which the original pattern is separated. The single colour components can normally be reproduced either positively or negatively. Whether positive or negative reproduction is preferred will depend on the following method steps. Colour strength or intensity is reproduced by varying the dot density in accordance with known rastering techniques.

As will be evident from the drawing, the gobo includes a plurality of superimposed disc-shaped and transparent substrates 2, 3, 4. In the illustrated case, each substrate has a thickness of about 0.1 mm and is made of glass, although other transparent and heat-resistant substrate materials may be used.

Applied to the surface of each of the substrates is a dichroic coating that forms a colour filter. Each colour-emitting surface coating presents the pattern of the single colour component and enables the colour strength to be reproduced through dot density.

A contrast pattern is obtained with colour separation. A dichroic coating is inappropriate with respect to the contrast, and a totally blocking surface-coating is required instead. This surface coating, which in the illustrated case is deposited on substrate 1, gives the pattern component of the contrast in the finished multi-colour gobo.

In order to stabilize the gobo and facilitate mounting of the gobo in the projector, the substrate 1 of the illustrated embodiment has a larger diameter and a greater thickness than the remaining substrates.

With the intention of reducing the sensitivity of the gobo to external influences, the substrates may conveniently be orientated so that none of the substrates will have an outwardly directed surface coating when mounted in position.

With reference to FIG. 1, the basic substrate 1 may present the contrast pattern on the surface thereof that faces towards the substrate 2. The substrate 2 may present its single-colour pattern in the surface coating that faces towards the substrate 3. The substrate 3 may present its single-colour pattern in the surface coating that faces towards the substrate 4. The substrate 4, however, will preferably be orientated so that the surface coating with the single-colour pattern faces towards the substrate 3, so as to avoid the surface coating of substrate 4 being scored or otherwise damaged. It will be observed, however, that if one of the substrates is turned so that the surface coating is located on another side than the remaining sides, which is the case of substrate 4, the pattern in the dichroic coating must be mirror-imaged so as to fit into the remaining pattern components in the correct manner.

When multi-colour gobos are assembled, fitting marks—if these have been transferred to the substrates—can be used to align the substrates such that the pattern components will be congruent. According to one preferred embodiment of the invention, the substrates have mutually different diameters in accordance with the colour which the surface layer transmits. One reason for this is to facilitate fixation of the substrates on top of one another. The substrates are joined together one at a time subsequent to having aligned the pattern components one on the other. When the upper substrate has a smaller outer diameter than an underlying substrate and the substrates have been positioned correctly, the substrates can be readily glued around their edges and against the upper side of an underlying substrate. If the glue joint should project slightly above the edge of the substrate, this will not prevent the alignment of the next-following substrate when this substrate, in turn, has a slightly smaller outer diameter. The glue joint presents no great problem even when the substrates have mutually the same diameter and when the thickness of the substrate is greater than 1 mm, although the risk of a glue joint or some other affixation means is liable to obstruct a following substrate when the thickness of the substrates is decreased.

In order to maintain a sharp projected image, the distance between the first and the last pattern component should not be too large. Trials have shown that the distance between the first and the last pattern-emitting surface coating will preferably lie beneath 1 mm. The distance is about 0.2 mm in the illustrated case. The distance will depend on the thickness of the substrates 2 and 3 and of the dichroic layers.

The basic substrate 1 with a material thickness of about 1 mm presents a total light-blocking coating of aluminium in the pattern of the contrast on its upper side. The surface coating has a thickness of about 0.40 m.

Substrates 2 to 4 have a material thickness of about 0.1 mm and are coated with a surface coating that reflects a determined light wavelength interval. The light wavelength intervals reflected by the different surface coatings correspond to the complementary colours to those colours that are to be transmitted through the colour filter. Thus, when the substrate is to function as a colour filter and transmit yellow light for instance, i.e. allow yellow light to pass through, the surface coating shall be optimized to reflect light in the wavelength interval of the colour complementary to yellow light, which is blue. Correspondingly, the colour cyan is transmitted when the surface layer reflects red, while magenta is transmitted when the surface layer reflects green.

In the illustrated embodiment, the colours cyan, magenta and yellow together with the contrast components constitute the colour pattern components into which the multi-colour pattern is separated.

A multi-colour gobo is produced in accordance with the illustrated embodiment, by colour separating the multi-colour pattern in a computer equipped with appropriate software for instance, such as to divide the multi-colour pattern into a specified number of single-colour patterns. These single-colour patterns are then transferred to dichroic surface coatings on disc-shaped, transparent substrates, these dichroic surface coatings transmitting light with the colour that respective single-colour patterns shall reproduce. Finally, the substrates containing the single-colour patterns are disposed in line with each other so as to reproduce the multi-colour pattern 5 when light is projected therethrough.

The colour-separated and rastered patterns are transferred onto films, one film per single-colour pattern.

The single-colour patterns are preferably transferred to the surface coatings lithographically. According to one embodiment, the surface coating may be provided with a photoresist layer which is then exposed, e.g. by contact copying, with its respective films. Exposure may be effected by means of UV light or the like, depending on the photo-resist chosen. Subsequent to developing the photoresist, the substrate may be placed in a bath and the surface coating etched away at those points where it is not protected by the photoresist.

In another embodiment, an inkjet printer or plotter, or some like device, may directly print-out, apply, the pattern with an etch-protective substance directly on the dichroic surface coating of the substrate, therewith enabling the surface coating to be etched so as to create the single-colour pattern therein.

In a further embodiment, a laser beam can be used to burn-out the single-colour pattern in the dichroic coating.

The dichroic surface coating is built-up by alternating with layers of high and low refractive index.

The first layer nearest the substrate will have a higher refractive index than the second layer, and the dichroic layers will have an optical thickness corresponding to a quarter of the light wavelength of the colour to be reflected. This last deposited layer in the surface coating, however, will preferably have an optical thickness corresponding to half the wavelength of the colour to be reflected.

By higher refractive index is meant a refractive index above 2, and by lower refractive index is meant a refractive index below 1.6.

The layers will normally include quartz and titanium dioxide, and the dichroic coating will normally include more than ten layers, preferably sixteen layers (i.e. eight layer pairs).

What is claimed is:

1. A gobo for projecting a pattern in several colors wherein the color-separated and rastered single-color components of the pattern are each reproduced in the gobo in a dichroic surface-coating corresponding to respective colors and disposed on a transparent substrate, said gobo comprising a plurality of mutually superimposed disc-shaped and transparent substrates, each substrate having disposed thereon a dichroic surface-coating for forming a color filter; whereby combinations of the color filters are capable of reproducing the colors of the multi-color pattern; and that respective color-emitting surface-coatings present a pattern that coincides with the pattern for corresponding color components in the multi-color pattern, said gobo further including a substrate that has a total-blocking surface-coating in a pattern corresponding to the contrast of the multi-color pattern; and in that each substrate has a surface coating on only one side of the substrate.

2. A gobo according to claim 1 wherein at least one of the disc-shaped substrates has a thickness of less than 0.2 mm.

3. A gobo according to claim 1 wherein the distance between the first and the last pattern-emitting plane in the gobo is less than about 1 mm.

4. A gobo according to claim 1 wherein said gobo includes a first substrate that has material thickness of about 1 mm and a total-blocking coating that presents the pattern of the contrast and that disposed on the first substrate are further substrates each of which has a material thickness of about 0.1 mm and a surface coating that reflects a determined light wavelength interval and that the light wavelength interval corresponds to the light wavelength of the complementary colors to those colors into which the multi-color pattern is separated; and that the surface coatings each present a respective single-color pattern.

5. A gobo according to 1 claim wherein there is deposited on the transparent disc-shaped substrate with the aid of a vacuum vaporization technique a dichroic surface-coating which includes alternative layers of high and low refractive index, resulting in reflection of incident light of a determined wavelength interval and the transmission of other incident wavelengths, such as to form a color filter.

6. A gobo according to claim 1 wherein the first layer closest to the substrate has a higher refractive index than the second layer; in the dichroic layer has an optical thickness corresponding to a quarter of the wavelength of the color to be reflected; and in that the last deposited layer in the surface-coating has an optical thickness corresponding to half the light wavelength of the color to be reflected.

7. A gobo according to claim 1, wherein the dichroic layers of higher refractive index have a refractive index greater than 2; in that the dichroic layers of lower refractive index have a refractive index below 1.6; in that the dichroic layers include quartz and titanium dioxide respectively; and in that the dichroic coating includes more than ten layers.

* * * * *